E. J. LEES.
GEAR GRINDER.
APPLICATION FILED SEPT. 2, 1919.
1,390,145.
Patented Sept. 6, 1921.
9 SHEETS—SHEET 1.
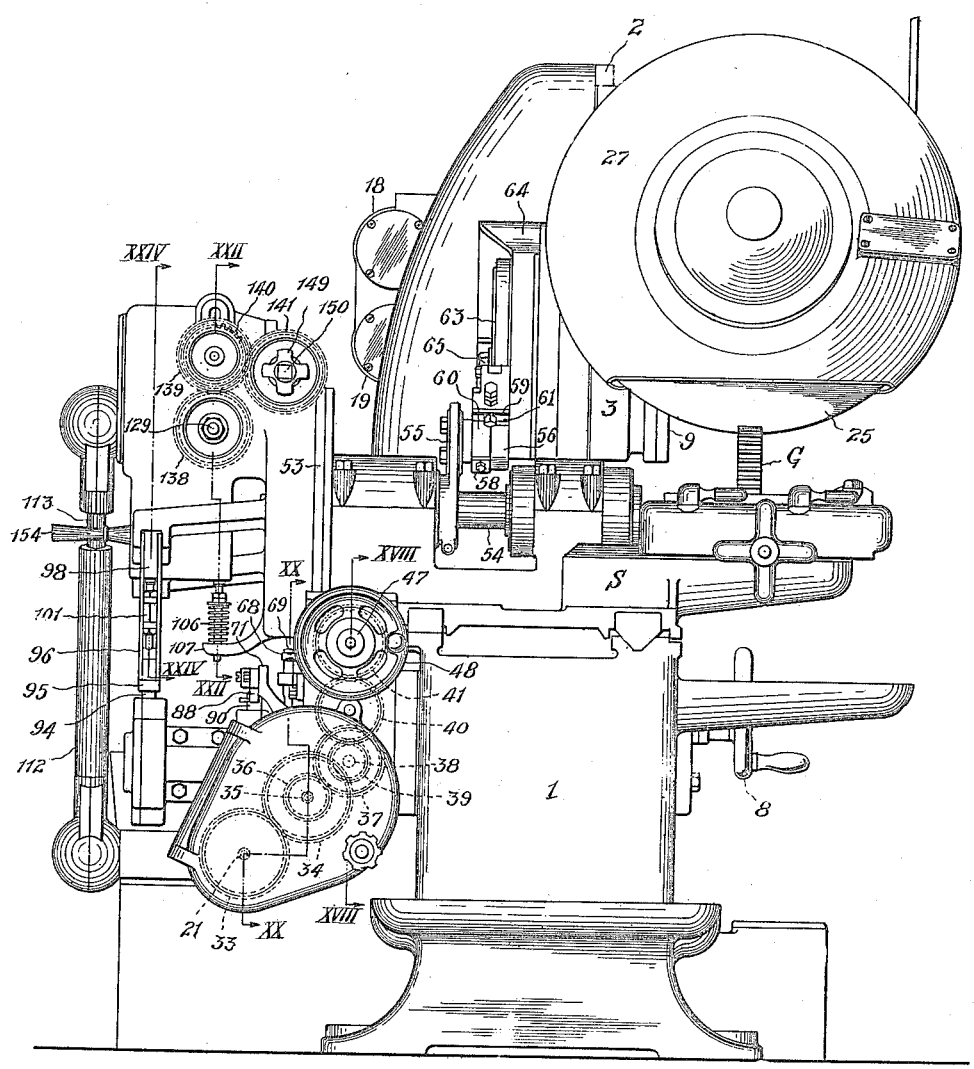
Fig. I
Inventor
ERNEST J. LEES
by his atty.

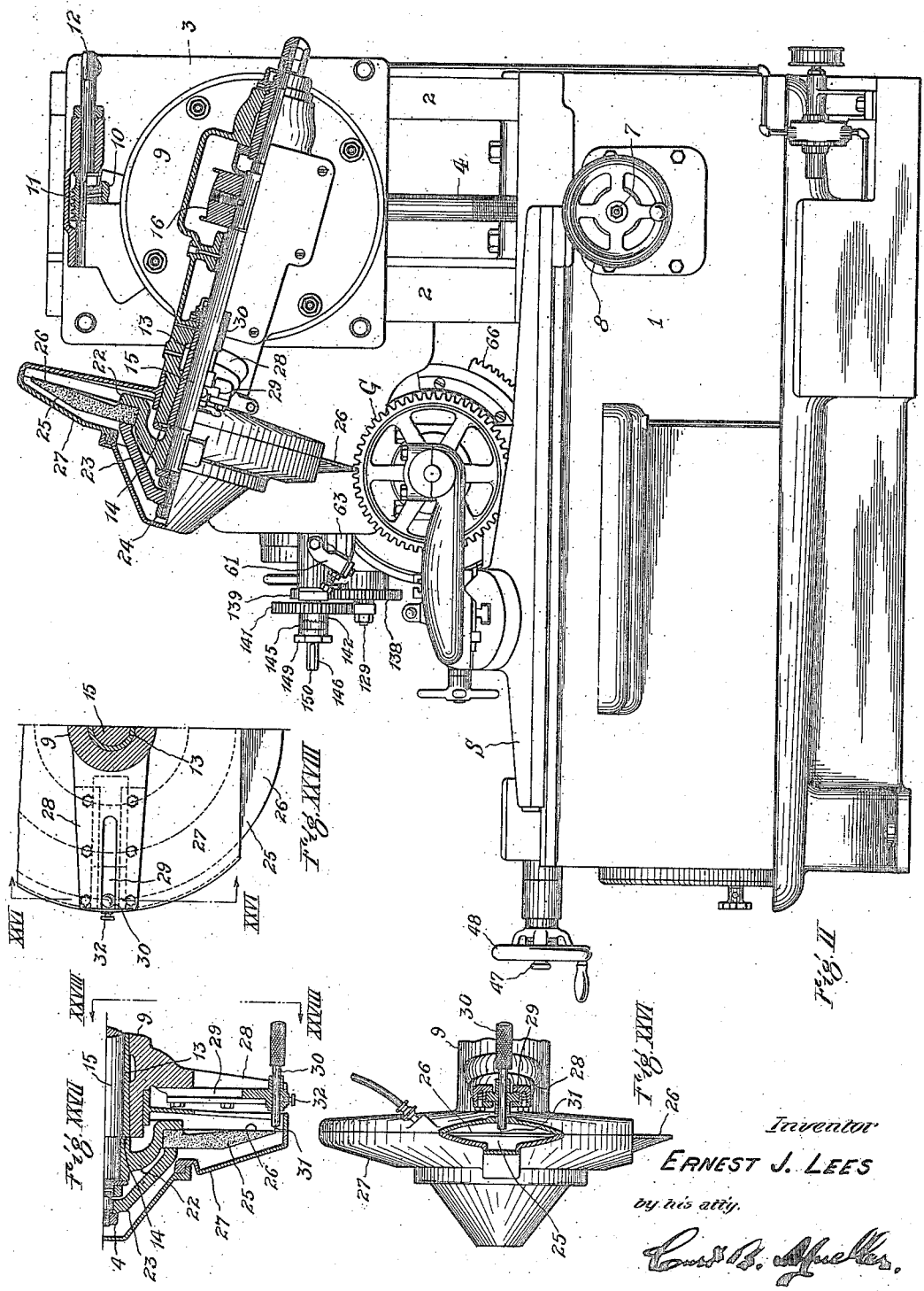

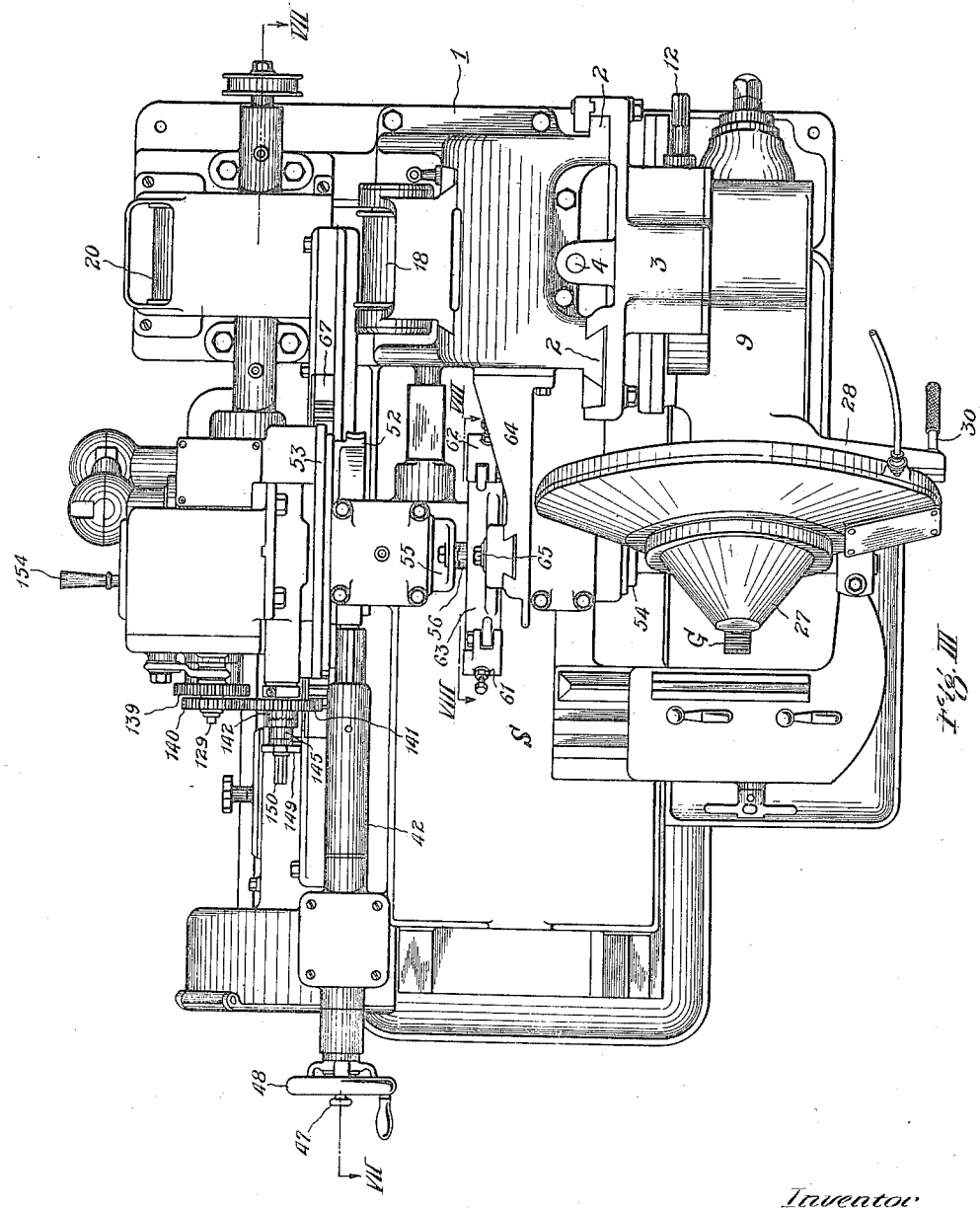

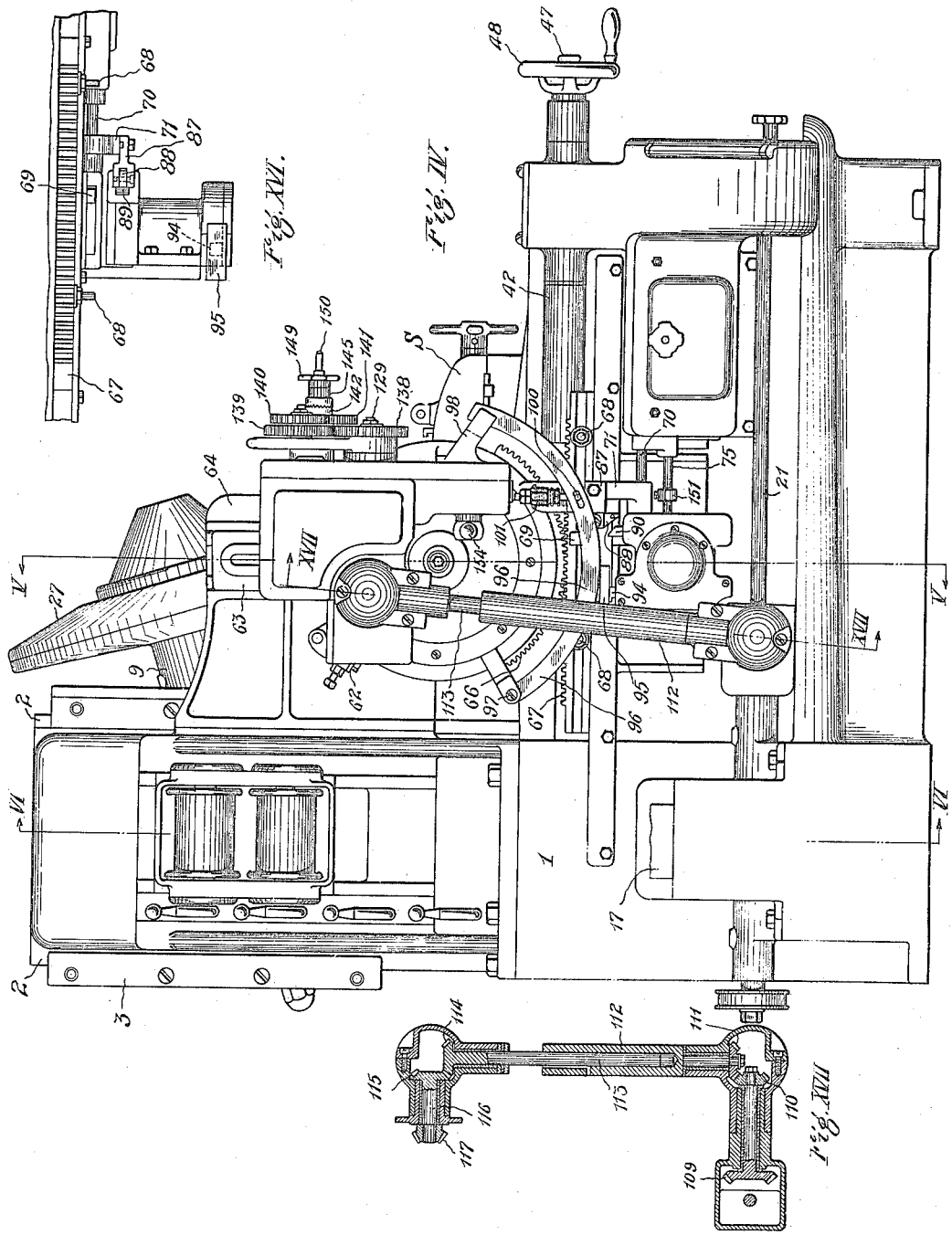

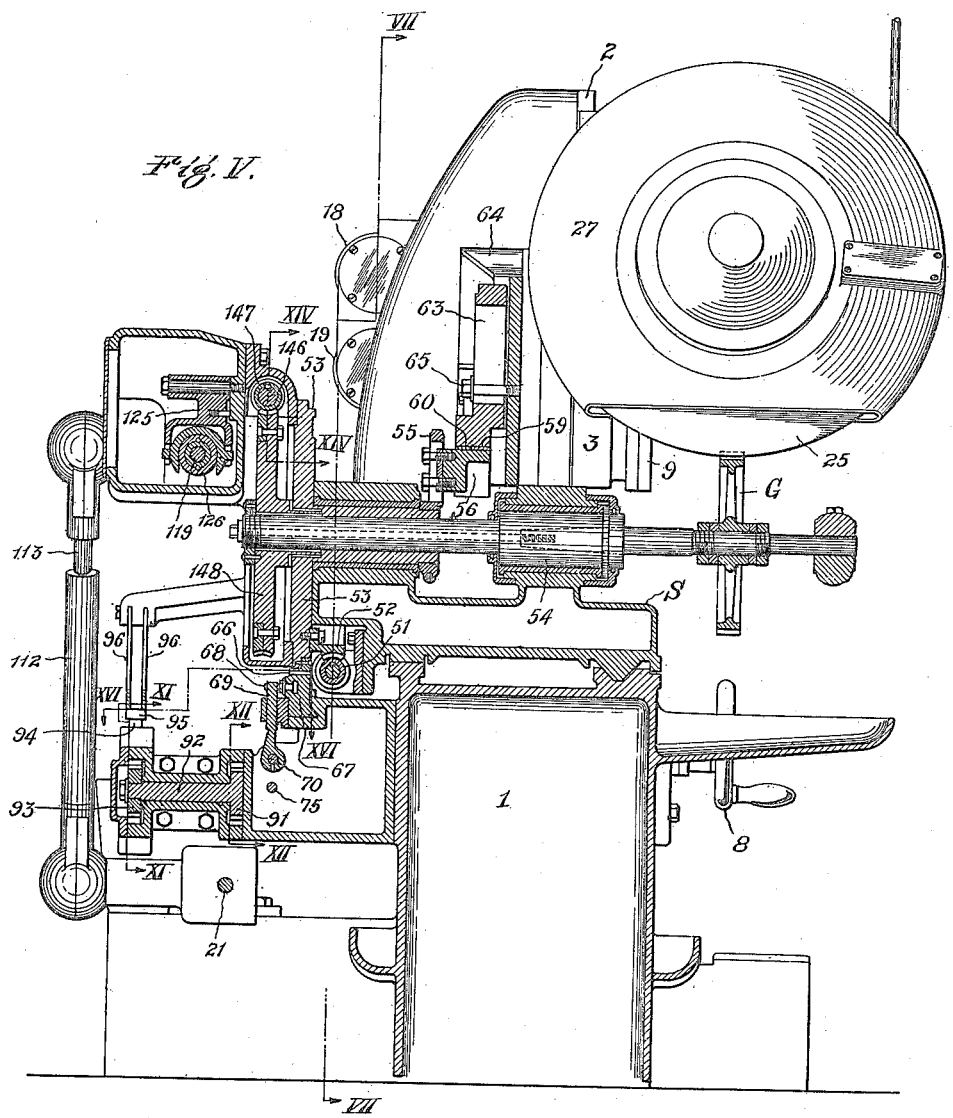

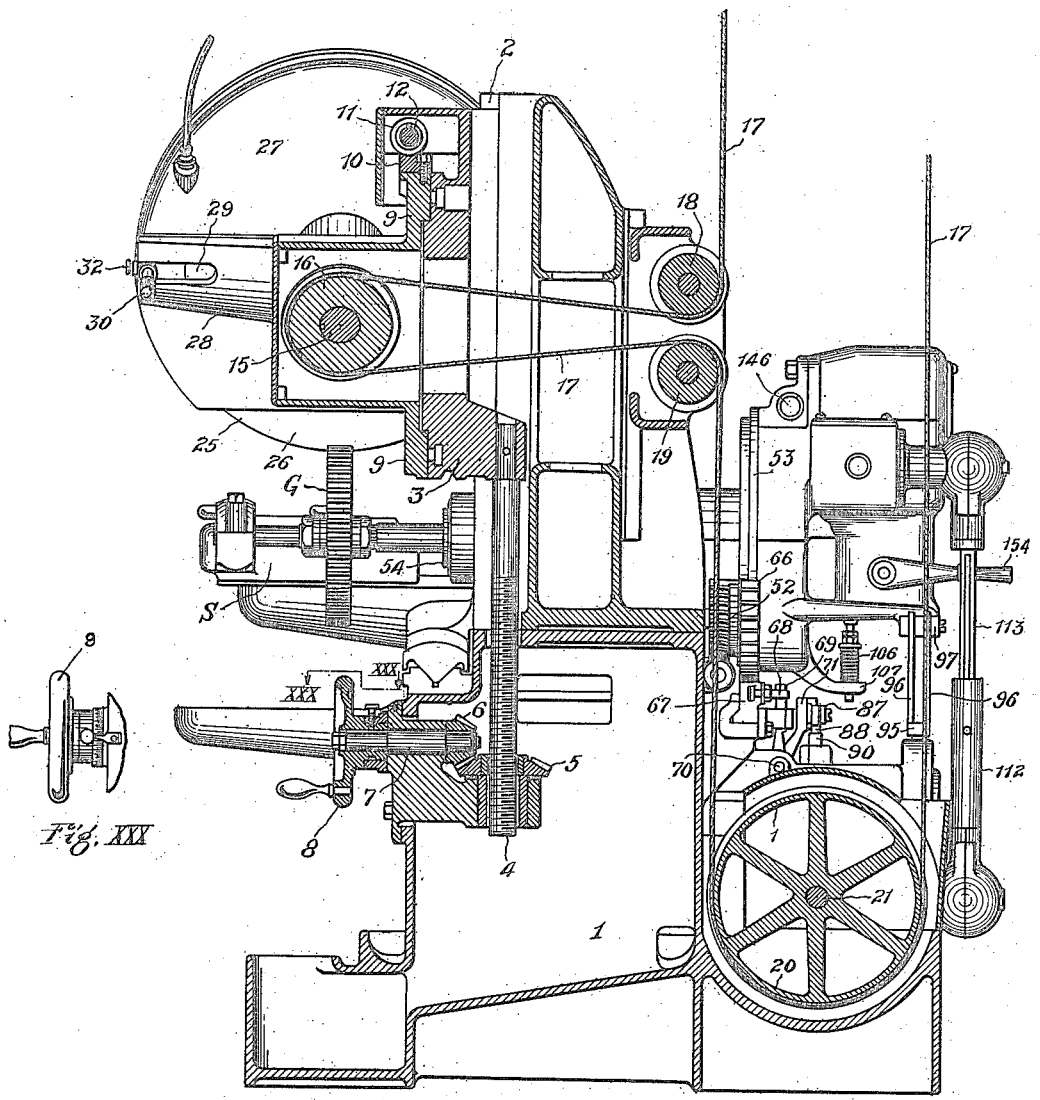

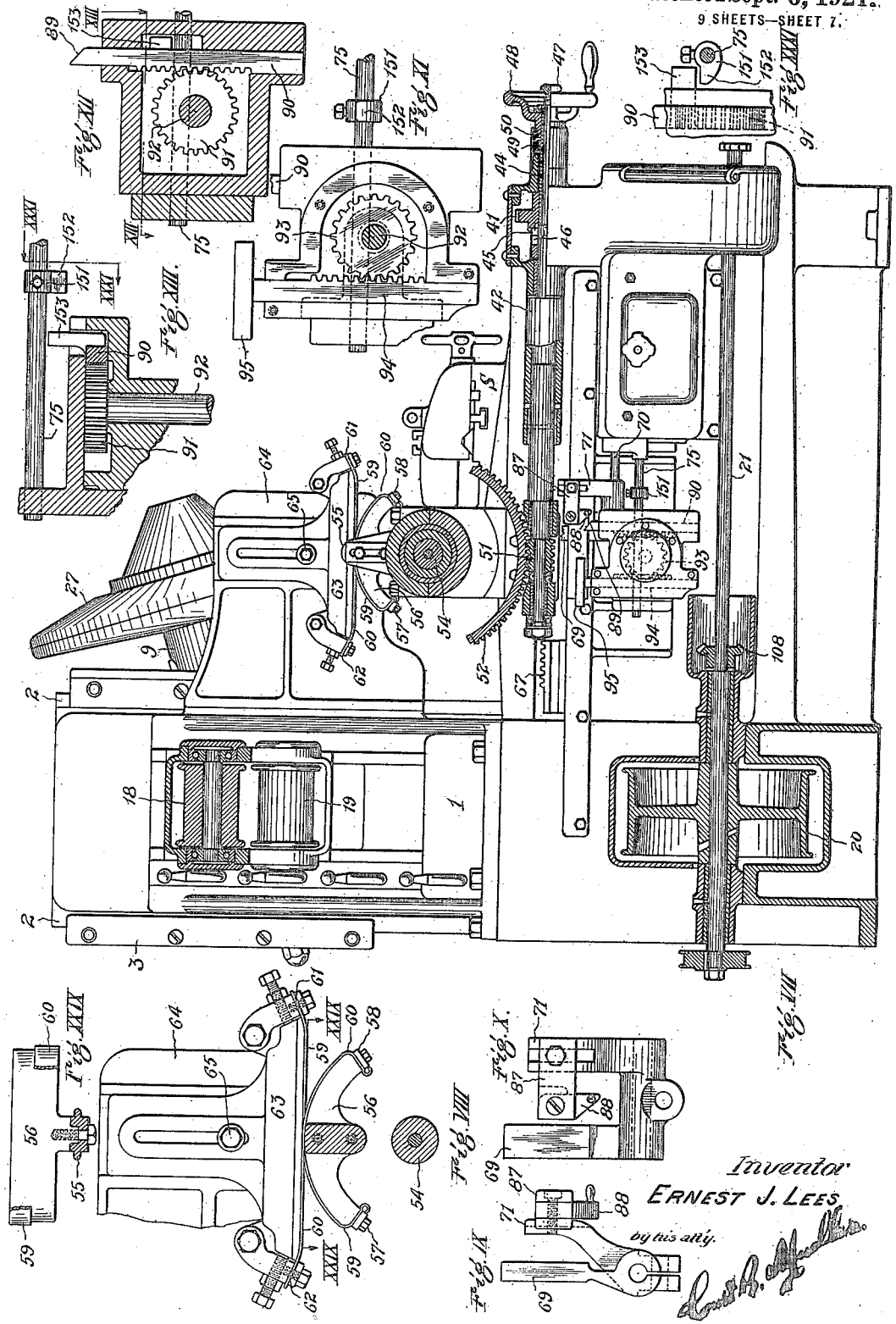

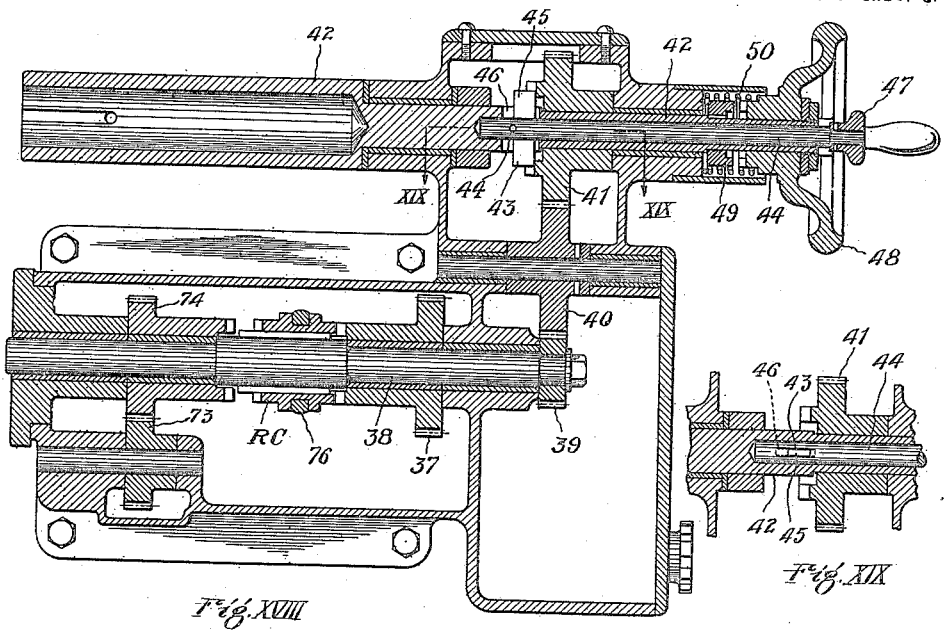
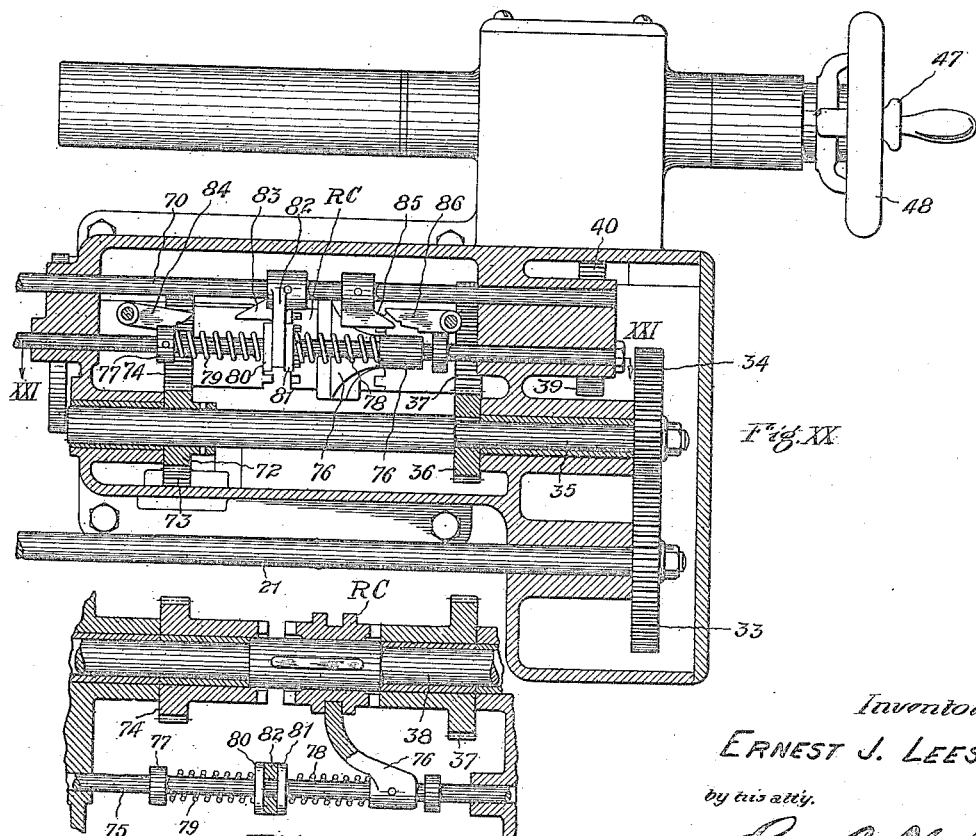

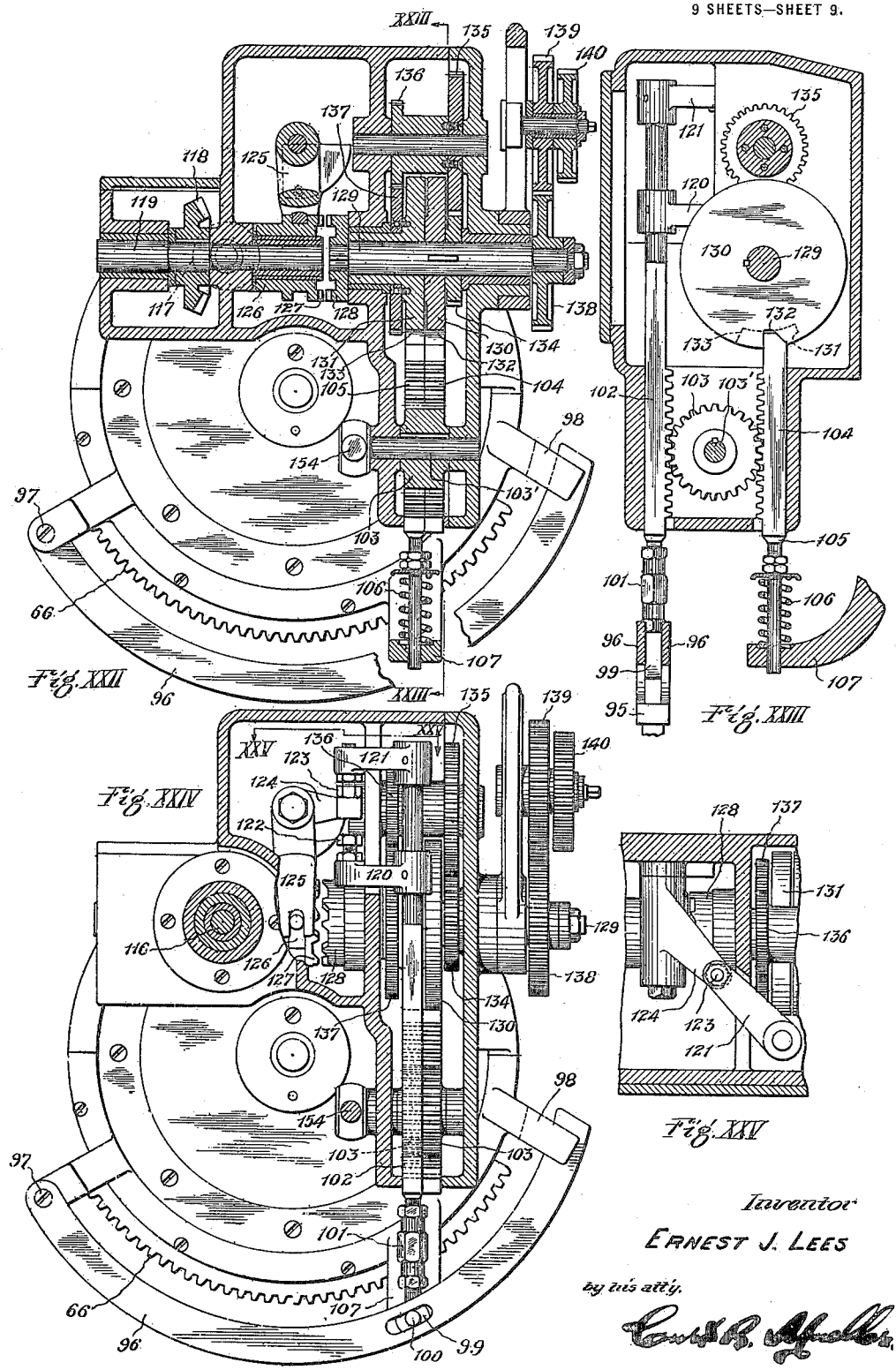

UNITED STATES PATENT OFFICE.

ERNEST J. LEES, OF CLEVELAND, OHIO, ASSIGNOR TO HOSEA T. BRADNER, OF CLEVELAND, OHIO.

GEAR-GRINDER.

1,390,145. Specification of Letters Patent. Patented Sept. 6, 1921.

Application filed September 2, 1919. Serial No. 321,010.

*To all whom it may concern:*

Be it known that I, ERNEST J. LEES, a citizen of the United States of America, residing at 3098 Berkshire rd., in the city of Cleveland and State of Ohio, have invented a new and useful Improvement in Gear-Grinders, of which the following is a specification, the principle of the invention being herein explained and the best mode in which I have contemplated applying that principle, so as to distinguish it from other inventions.

My invention pertains to a gear generating machine and more particularly, according to the exemplification which the drawings disclose, to a gear generating grinder.

The object of my invention is to provide a machine of the character stated which besides being strong and compact will present the following advantages;

1. Translating the power applied from a rotating part to a slide which carries it so as to effect a compound movement.

2. Provision of an abrading wheel of sufficiently large diameter to cover the entire working face from side to side of the gear to be ground.

3. Double adjustment of the abrading wheel both along a straight line and along an arc.

4. Arrangement whereby the plane of the cutting face of the abrading wheel is intersected by the bearing in which its supporting spindle turns in order to realize a steadier action.

5. Employment of flexible members inversely wound about the axis of the work spindle for transferring the turning movement of the latter into bodily movement of the same along a straight line; together with means for adjusting the tension in such flexible members.

The machine embodying my invention is to grind gears of the involute system such that all gears so ground comprehend the base theory of the involute rack system, there being a relative rolling action of the generating scheme so that all gears of the same pressure angle will be interchangeable regardless of the number of teeth.

Adverting to the drawings:—

Figure I is a front elevation of a machine embodying my invention.

Fig. II is a right side elevation of the same.

Fig. III is a top plan view of the machine.

Fig. IV is a left side elevation.

Fig. V is a vertical cross section on line V—V of Fig. IV looking rearwardly.

Fig. VI is a vertical cross section on line VI—VI of Fig. IV looking forwardly.

Fig. VII is a vertical longitudinal section (from front to rear) taken on line VII—VII of Figs. III and V looking in the direction of the indicating arrows.

Fig. VIII is an enlarged vertical section on line VIII—VIII of Fig. III looking toward the right side of the machine.

Figs. IX and X are end and front views of elements of the indexing mechanism.

Fig. XI is a vertical section on line XI—XI of Fig. V looking to the right.

Fig. XII is a vertical section on line XII—XII of Fig. V likewise looking to the right.

Fig. XIII is a horizontal section on line XIII—XIII of Fig. XII looking downwardly.

Fig. XIV is an enlarged vertical section on line XIV—XIV of Fig. V also looking to the right.

Fig. XV is a fragmentary elevation of parts shown at one end in Fig. XIV.

Fig. XVI is a section on line XVI—XVI of Fig. V looking downwardly.

Fig. XVII is a section on line XVII—XVII of Fig. IV.

Fig. XVIII is an enlarged vertical section on line XVIII—XVIII of Fig. I looking to the right.

Fig. XIX is a horizontal section on line XIX—XIX of Fig. XVIII.

Fig. XX is an enlarged section on zigzag line XX—XX of Fig. I looking to the right.

Fig. XXI is a horizontal section on line XXI—XXI of Fig. XX looking downwardly.

Fig. XXII is an enlarged vertical section on line XXII—XXII of Fig. I.

Fig. XXIII is a section on line XXIII—XXIII of Fig. XXII.

Fig. XXIV is an enlarged section on line XXIV—XXIV of Fig. I.

Fig. XXV is a horizontal section on line XXV—XXV of Fig. XXIV.

Fig. XXVI is a fragmentary view of the abrading and associated elements, partly in section on the line XXVI—XXVI of Fig. XXVIII.

Fig. XXVII is a fragmentary sectional view through parts shown in Fig. XXVI.

Fig. XXVIII is a fragmentary view of the parts shown in Fig. XXVII on the line XXVIII—XXVIII.

Fig. XXIX is a fragmentary section of tape segment and supporting arm taken on line XXIX—XXIX of Fig. VIII.

Fig. XXX is a fragmentary view looking downwardly on line XXX—XXX of Fig. VI.

Fig. XXXI is a sectional view on line XXXI—XXXI of Fig. XIII.

*Abrading wheel mounting and drive.*

The frame or bed 1 of the machine carries at its rear end an up-right extension fashioned with guide ways 2 to enable the adjustment vertically therealong of a slide 3, such adjustment being accomplished in the usual manner by means of a screw 4 operatively connected to the slide and controlled by customary mechanism best seen in Fig. VI. The screw 4 moves axially through it when a bevel gear 5 thereon is turned by a bevel pinion 6 which is mounted on a shaft 7 on the end of which is a hand wheel 8. Such up and down adjustment of the tool carrying slide is required for the various diameters of gears to be ground.

I have provided for an additional adjustment of the abrading wheel along an arcuate path so as to set it at the various angles which are proper for gears of various pressure angles. Accordingly, a tool carrying head 9 is swiveled in any approved manner upon the slide 3 and is adapted to be turned in a manner common to the art, for example, by means of a worm wheel 10 secured to the head and turned by a worm 11 as shown in Figs. II and VI. On the end of the worm shaft 12, a crank handle may be applied for the purpose just stated.

Supported by the head 9 is a bearing 13 having a projecting end 14 as appears to view in Fig. II. Rotatably mounted within a bearing 13 is a tool spindle 15 adapted to be driven by a belt 17 applied to a pulley 16. The belt 17 passes under a pulley 18, around the pulley 16, over another pulley 19, around a fast pulley 20 and thence back to the counter shaft above. The pulley 20 is mounted on a main drive shaft 21 shown in Figs. VI and VII from which power is communicated, as will hereinafter appear, to other movable parts of the machine.

The spindle 15 projects beyond the bearing end 14 and carries a pair of disk flanges 22 and 23 adapted by means of a nut 24 on the end of the spindle to clamp against opposite sides of an abrading wheel 25 as is illustrated in Fig. II. The wheel 25 will be seen to be of large diameter sufficiently so to extend across the entire face of the gear G to be ground and it is to be particularly noticed that its cutting face 26 is disposed beyond the end 14 of the bearing, that is to say, nearer to the pulley 16. In other words, the end 14 of the bearing intersects the plane of the cutting face of the tool, whereby to reduce the tendency to a whipping action and in consequence minimize vibration. A guard 27 preferably incloses the major portion of the wheel 25.

Directing attention to Figs. XXVI, XXVII and XXVIII it will be seen that the rear of the head 9 carries a bracket 28 provided with a radial slot 29 in registry with a corresponding slot in the rear face of the guard. A handled stem 30 provided on its inner end with a diamond 31 is mounted for adjustment both along the slots 29 and in and out in relatively perpendicular direction. Its in and out position may be fixed by means of a set screw 32 so that, as occasion may require, the diamond point 31 may be caused to engage the cutting face of the wheel 25 and by movement lengthwise of the slots 29 serve to true-up the cutting face of the wheel.

*Work spindle rolling.*

According to the exemplification of the drawings the gear blank G is to be given the rolling movement required in carrying out the generating principle. To accomplish such rolling movement I employ mechanism including flexible tapes adapted to wind and unwind about a segment having the same diameter as the pitch diameter of the gear to be ground. I am aware that such an employment of tapes is not in itself new, but instead of employing them as heretofore I reverse the manner in which they are utilized to translate power. Instead of actuating a slide and causing the power thus applied to turn a spindle in one direction through the medium tapes (or reciprocating a slide to successively turn a spindle in opposite directions by means of tapes), I apply power to the spindle and translate it to straight line movement on the part of the slide and thereby realize the following noteworthy advantage. If the slide actuation is the initiating power it must be accomplished by either a rack and pinion or a screw, or a bell-crank lever, or a piston arrangement or, in any event, some mechanical connection certain to involve back-lash and resultant lost motion with its attendant inaccuracy. Moreover, any mechanism required to reciprocate a slide inevitably involves alternate impacts and in consequence vibration or tremble. My reversal of the manner of employing tapes eliminates the possibility of error because the action is always positive, certain and smooth owing to having only one direct applied power for both components of the required rolling movement.

Mounted on the front end of the main driving shaft 21 as appears in Figs. I and XX is a gear 33 which is the first unit of change gearing appearing in dotted lines in Fig. I and further shown enlarged either in elevation or in section in Figs. XX and XVIII. The gear 33 drives a gear 34 which is mounted on the end of a shaft 35. Another gear 36 mounted on the same shaft drives a gear 37 connected by means of a reversing clutch R. C. with a shaft 38 which latter drives another gear 39 and thence through an idler 40 drives a gear 41 which is loose upon a sleeve 42. The gear 41 is adapted to have jaw tooth connection with a clutch member 43 which is rotatably interlocked, but slidably connected with a rod 44, which passes through the sleeve 42, by means of a pin 45 inserted through a suitably elongated slot 46 as is clearly shown in Fig. XIX. The rod 44 is movable in an axial direction through the sleeve 42 and such movement may be accomplished by manipulation of a knob 47 on its outer end, whereby the clutch member 43 may be thrown into or moved out of engagement with the gear 41 so as to make or break the rotatable connection of the latter with the sleeve 42. Mounted on the outer end of the sleeve 42 is a hand wheel 48 adapted to be rotatably connected with a clutch member 49 which is keyed to the sleeve 42. The action of a spring 50 must be overcome in order to accomplish such clutch action. As will be readily understood when it is desired to drive the sleeve 42 by power the knob 47 is pulled out so as to effect the clutching engagement of the member 43 with the gear 41. If, on the other hand, it is desired to effect the rotation of the sleeve 42 by hand the knob 47 is pushed in and likewise the hand wheel 48 and thereafter the latter may be caused to rotate the sleeve 42 at will.

Directing attention to Figs. V and VII, it will be seen in the latter that the sleeve 42 is in splined connection with a worm shaft carrying a worm 51 which meshes with a worm wheel segment 52 which is carried, as shown in Fig. V, by a disk 53 which is mounted upon a work spindle 54, carrying an arbor and gear and the whole carried by a slide S. In consequence, when the disk 53 is oscillated everything carried thereby and particularly the indexing mechanism to be later described will be correspondingly moved. Extending upwardly from a forwardly extended sleeve of the disk 53 is a bracket 55 along which a smooth segment 56 may be secured for adjustment radially of the axis of the spindle 54 as suggested by the cap screws in Figs. VII and VIII, in order to be suitably located for gear blanks of various diameter. At its ends the segment 56 is provided with clamping attachments 57 and 58 adapted to secure two ends of a pair of steel tapes 59 and 60 which pass alongside each other in opposite directions around the segment and which have their other ends adjustably attached at 61 and 62, respectively, to opposite sides of a bracket 63 which is mounted for up and down adjustment upon a fixture 64 projected from an upward extension of the frame. The bracket 63 may be fixed in various positions by means of a cap screw 65, the construction enabling such adjustment being better shown in Fig. XXIX just above Fig. VIII. It is desirable that the relatively movable surfaces of the brackets 55 and 63 and the segment 56 and fixture 64, respectively, be accurately fitted so that the whole when secured in some particular position permits of a firm and steady action when subjected to the pull of the tapes.

As has been already stated the abrading wheel 25 is of large enough diameter to cover the entire working face from side to side, of each tooth of the gear G to be ground and of course the clearance at the roots of the gear teeth will permit the periphery of the wheel 25 to enter deep enough. It is to be understood moreover, that each tooth face of the gear is to be ground twice, before indexing first during the rolling movement of the blank G in one direction and thereafter during the rolling movement of the blank in the opposite direction. It may not be amiss to state at this point that the relative movement bodily of one of the engageable parts toward the other need not necessarily be effected by the straight line movement of the blank shown by way of example in the accompanying drawings, since it is apparent that either the brading wheel or the work may be traveled. After the reciprocal roll of the gear blank and while the wheel 25 is beyond the outer periphery of the blank the latter must be indexed in order to bring the next alternate tooth face into proper position.

*Reversing mechanism.*

Carried outwardly beyond the plane on which Fig. VII is a section, so as to be moved along with the disk 53 is a spur gear segment 66 shown in Figs. IV and V. Such segment engages the teeth of a rack 67 from which two pins 68 project laterally so that during their reciprocal movement first one and then the other engages a vertical member 69 clamped on a horizontal rod 70 as shown in Figs. IV, V and VII. The upwardly projecting member 69 is shown in detail in Figs. IX and X together with another laterally and upwardly projected member 71. It is from the movement of the latter that the indexing mechanism receives its actuation in a manner to be subsequently described.

An observation of Figs. XVIII, XX and XXI will show how the automatic actuation of the clutch RC may be accomplished. The shaft 35 carries another gear 72 adapted to mesh with an idler 73 which in turn drives a gear 74 adapted to have a clutching engagement with the clutch member RC on the side opposite to that from which the gear 37 may be locked therewith as shown in Figs. XVIII and XX. It is evident that when the power from the main shaft 21 is communicated through the idler 73 the rotation of the sleeve 42 must be the reverse of what it would be when the power transmitted directly from the gear 36 to the gear 37. When therefore, the reciprocation of the rack 67 is communicated to reciprocation of the rod 70, the provision of a common type of "load and fire" mechanism will serve to shift the clutch member RC in the following manner. Inasmuch as nothing is claimed for such mechanism, it will be very briefly described.

Secured upon a shifter rod 75 also shown in Fig. XXI is a shifter arm 76 adapted to have forked connection with the clutch member RC. Also secured upon the rod 75 is a collar 77. Springs 78 and 79 are interposed between the arm 76 and collar 77 and an interjacent pair of collars 80 and 81. Secured upon the rod 70 is a depending arm 82 one end of which is interposed between the collars 80 and 81 so that its movement along with the rod 70 compresses either the spring 78 or the spring 79 depending upon the direction in which it is moved. The arm 82 carries a dog 83 adapted to lift a pawl 84 after a given degree of compression of the spring 79 whereupon the collar 77 is released and the rod 75 suddenly shifted so that the gear 74 is engaged by the clutch RC. The rod 70 carries another depending arm provided with an oppositely directed dog 85 which acts to similarly lift another pawl 86 whereby the operation may be repeated after the reverse movement of the rod 70 has continued for a certain distance.

It will thus be clear that oscillation concentric with the axis of the work spindle 54, the arbor therein and the gear G carried by the latter acts to draw the slide S back and forth as translated through the agency of the tapes 59 and 60.

*Indexing mechanism.*

As is familiar to those skilled in the art the gear G must be indexed after each particular tooth face has been ground, and such indexing or slight turning of the gear to bring the next tooth into position is accomplished automatically. The principle of the operation of the indexing mechanism is not new nor will anything be claimed herein for the specific structure. Accordingly, the indexing mechanism may also be tersely described.

The second up-right member 71 shown in Figs. I, IV, VII, IX, X, and XVI which is reciprocable with the shaft 70 carries a laterally extending arm 87 from which a latch 88 is pivotally suspended. This latch has a tapered under surface adapted to engage the tapered upper end 89 of a rack plunger 90, see Fig. XII. According to the position of the parts as appearing in Fig. VII the latch 88 is being carried to the left and is itself supported upon the arm 87 so that it will firmly engage the surface 89 causing the rack 90 to move downwardly. On its return the latch 88 is enabled to swing upwardly and ride over the extremity 89. As the rack 90 moves downwardly it turns a gear 91 on one end of a short shaft 92 which in turn rotates another gear 93 mounted on the other end thereof. The gear 93 acts to move another rack 94 upwardly and in consequence a plate 95 carried upon its upper outwardly projecting extremity. As appears in Fig. IV the plate 95 simultaneously engages the under surfaces of a pair of arcuate bars 96. These arcuate bars may also be seen in Fig. V and enlarged in Figs. XXII and XXIV to which attention should now be directed. Both of the bars 96 are secured at 97 and are capable of yielding upwardly between guides 98. An eye 99 is mounted between the two bars and carries a pin 100 with which a turnbuckle 101 articulates. Connected with the turnbuckle is a rack 102 the teeth of which engage a long faced pinion 103 on a short shaft 103' and the teeth on the opposite side of the gear 103 engage with a pair of racks 104 and 105 (see Fig. XXII) to move the same together downwardly against the action of a return spring 106 which is supported upon a fixture 107. Before continuing the description of the parts which will coöperate with the rack 104 for the purpose of keeping the power for indexing applied long enough to turn in the gear G the proper amount, the source and train of mechanism for effecting the indexing by power will be explained.

Looking at Fig. VII a pinion 108 will be seen mounted upon the shaft 21 from which power is communicated to a gear 109 (see Fig. XVII) thence along a short horizontal shaft to a bevel pinion 110, to a bevel pinion 111 at the bottom of an upwardly extending sleeve 112 within which a shaft 113 is splined so as to be movable axially therealong as well as rotate therewith. The upper end of the shaft 113 carries a bevel pinion 114 meshing with a pinion 115 on a short horizontal shaft 116 on the other end of which is a pinion 117. The pinion 117 drives a bevel gear 118 mounted on a shaft 119 as clearly appears in Fig. XXII. It is to be understood therefore that the shaft 119 is constantly rotating.

The rack 102 extends upwardly a considerable distance as shown in Fig. XXIII and carries in spaced relation a pair of brackets 120 and 121 the free ends of which carry adjustable set screws 122 and 123, respectively, as shown in Fig. XXIV. The opposed surfaces of the set screws are spaced apart a greater distance than the thickness of the end of a rocker arm 124 which is interposed therebetween so as to be alternatively engaged thereby. The arm 124 moves a shifter fork 125 which articulates with and may slide a clutch member 126 having jaw teeth 127. These teeth are adapted to engage complementary clutch teeth on a clutch member 128 which is keyed to another shaft 129. Two disks 130 and 131 are mounted upon the shaft 129 directly above the racks 104 and 105, respectively. The disk 130 is keyed to the shaft 129 whereas the disk 131 is loose thereon. The disk 130 is formed with a peripheral recess 132 attached to receive the upper extremity of the rack 104 with a substantially accurate fit as appears in Fig. XXIII. The loose disk 131 which is behind the disk 130 as viewed in the figure just mentioned is fashioned with a larger peripheral recess 133 adapted to be occupied by the upper extremity of the rack 105. Such larger recess appears in dotted lines in Fig. XXIII. When the clutch connection is made between the shafts 119 and 129 the disk 130 will of course be rotated, provided the rack 104 has been withdrawn from its obstructing position as shown in Fig. XXIII. The shaft 129 drives a gear 134 which meshes with a gear 135 by means of which a gear 136 on the same shaft is driven and such gear in turn drives a gear 137 which is secured to the loose disk 131. The ratio of the gearing just described is one of reduction so that the disk 131 will rotate exactly one third as fast as the disk 130 for a purpose to be hereinafter explained. Upon the extremity of the shaft 129 is a gear 138 constituting the first unit of change gearing to control the speed but not the limit of the indexing movement of the gear blank G. The gear 138 drives a gear 139 and therefore also a gear 140 both of which are fixedly mounted on the same bushing. The gears 138, 139 and 140 are shown in Figs. I, IV, and XXII. The gear 140 meshes with a gear 141 shown in Fig. XIV and such gear in turn drives one unit 142 of a clutch device. The teeth 143 of such device are preferably fine, as shown in Fig. XV, in order to permit of a delicate adjustment in the manner to be presently described. A spring 144 is interposed so as to tend normally to move the other unit 145 of the clutch device along the shaft 146, on which both are mounted, in a direction away from the unit 142. On the side of the gear 141 opposite to that where the clutch device is located the shaft 146 carries a worm 147 adapted to turn a many toothed worm wheel 148. This last mentioned connection is shown in Figs. V and XIV. The worm wheel 148 is mounted on the rear end of the work spindle 54, in consequence of which its turning movement may be communicated thereto. The provision of a large number of teeth in the worm wheel 148 further assists in enabling pressure adjustment by hand as will now be explained.

As is well known it is important to have not only an accurate initial set up for the work piece, but to be able to effect a nice compensation for wear. Re-directing attention to Fig. XIV it will be seen that a nut 149 is in screw threaded connection near the outer end of the shaft 146 and is adapted when turned up to move in the unit 145 to overcome the action of the spring 144 and thus maintain the clutching engagement. The outer extremity 150 of the shaft 146 is shown squared to enable it to be turned, and in consequence the worm wheel 148 and work spindle, by the application of a crank handle (not shown) after the nut 149 has been sufficiently unscrewed to permit the spring 144 to disengage the clutch teeth.

In order to preclude the possibility of a rolling movement of the gear G before the indexing operation is complete, I provide a safety device which automatically obstructs the operation of the reversing mechanism until the indexing movement is concluded. If the reader will look at Figs. VII, XXXI and XIII, he will observe that the rod 75 carries a collar 151 fixed to it and provided with a projection 152 best seen in Figs. XIII and XXXI. In Figs. XII and XIII it may also be seen that the rack plunger 90 carries a forwardly extended ear 153 which intersects the path of movement of the projection 152.

*Operation.*

After the gear G has been mounted as appears in Fig. V and the adjustments of the brackets 55 and 63 have been made according to the diameter of the gear G, the wheel 25 has been doubly adjusted with consideration both of the diameter and of the pressure angle thereof and the gear G has been turned to proper position through the medium of the shaft 146; the tight pulleys 16 and 20 may be set in motion. The rotation of the pulley 20 transmits power along the shaft 21 through the change gear units 33 and 39 so as to drive the sleeve 42 and oscillate the worm wheel 52 and segment 56. When such segment is turned in one direction one of the tapes pulls the main slide S in one direction toward that end of the bracket 63 to which the particular tape is attached. It is evident therefore that power applied as a turning movement about the axis of the work spindle 54 is translated into smooth and firm travel of the main supporting slide. The translating action is moreover positive and substantially noiseless and is particularly advantageous owing to the fact that no back-lash and therefore lost motion can attend the reversing action of the mechanism employing the tapes after the manner of my invention.

The rolling movement of the work spindle and other parts notably the gear segment 66 causes a reciprocation of the rack 67 which is adapted to alternately actuate the indexing mechanism. In the meantime the reciprocation of the rod 70 in unison with the movement of the vertical member 69 when it is engaged and moved by one of the pins 68 on the rack, actuates the reversing mechanism including the reversing clutch RC. As the reversing mechanism reaches a certain stage of its action, the rod 70 carrying the upright member 71 causes the actuation of the indexing mechanism in its entirety by depressing the plunger rack 90 raising the rack 94 together with the plate 95 at the top thereof, thus springing the arcuate bars 96 upwardly to carry the rack 102 up and therefore the rack 104 down. Presently the tops of the racks 104 and 105 are withdrawn from their recesses 132 and 133 respectively, and the operation of the clutch member 125 is so timed that the shaft 119 will commence to drive the shaft 129 and therefore to rotate the two disks 130 and 131 as soon as the withdrawal of the racks 104 and 105 permits. Such timing is enabled by reason of the adjustable spacing of the lock screws 122 and 123 whereby an interval of time elapses sufficient to allow the withdrawal of the racks 104 and 105 beyond the lower peripheries of the disks 130 and 131 before the clutch 125 is thrown in.

In order to make the drive smoother and to lend accuracy the disk 131 is rotated only one third as rapidly as the disk 130. Inasmuch as the racks 104 and 105 are secured to each other and therefore must move upwardly in unison, when the recess 132 again comes into position over the top of the rack 105 the recess 133 will have been carried only one third of the way around. In consequence, the rack 104 is not yet permitted to move upwardly and therefore the rack 105 is likewise still being held down by the rack 104. Not until the disk 131 reaches the end of its third revolution will the recesses 132 and 133 again register and thus permit both of the racks 104 and 105 to slip into their appropriately located recesses as actuated by the spring 106. Such upward movement of the rack 105 promptly causes the downward movement of the rack 102 and therefore throws out the clutch 125. As long as the plunger 90, Fig. XII, is down, the ear 153 secured thereto obstructs the movement of the projection 152. Therefore the reversing mechanism which is actuated by the movement of the rod 75 cannot functionate until the extremities of the racks 104 and 105 again occupy their recesses 132 and 133 to stop the indexing mechanism. It will thus be apparent that the actuation of the reversing mechanism is subject to the completion of the automatic indexing operation. If it is desired to index independently of the reversing mechanism this can be done by lifting the handle 154 (which is fixedly secured to the shaft 103') upwardly. This movement disengages the upper ends of the racks 104 and 105 from the disks and causes the clutch 126 to engage clutch 128 and thus rotate or index the gear G as will be readily understood.

I claim:—

1. In apparatus of the class described, the combination of a frame, a slide movable thereon, a spindle rotatably mounted upon said slide, means for rotating said spindle, a segment arranged to rotate with said spindle, and flexible means connecting said frame and segment and adapted to effect the bodily movement of said spindle.

2. In apparatus of the class described, the combination of a frame, a slide movable thereon, a spindle rotatably mounted upon said slide, means for rotating said spindle, a segment arranged to rotate with said spindle, and means including a tape stretched between said segment and frame and adapted to translate the applied power into movement of said slide.

3. In apparatus of the class described, the combination of a frame, a slide movable thereon, a spindle rotatably mounted upon said slide, means for rotating said spindle in opposite directions, a segment arranged to rotate with said spindle, and a pair of flexible members attached to said frame and to said segment and adapted to translate the reversed rotations of said spindle into reciprocation of said slide.

4. A gear generating machine comprising, a frame, a rotatably mounted work piece, a rotatably mounted tool, a slide movable upon said frame and supporting one of said engageable parts, means for rotating said parts, and connections between said slide supported rotatable part and frame whereby the applied power is converted into slide actuation.

5. A gear generating grinder comprising, a frame, a rotatably mounted blank, a rotary tool, a slide movable upon said frame and supporting said blank, means for rotating said blank in reversed directions, and a connection between said blank and frame including a pair of members one adapted to be wound about the other, whereby the rotation of said blank is converted into slide actuation and both components of the desired reversed rolling movement of the blank may be realized without back-lash or the impact and resultant vibration consequent thereto.

6. A gear generating grinder comprising a frame, a rotatably mounted element to be ground, a rotary tool element, a slide movable upon said frame and supporting one of said elements, separate means for rotating said elements, and an adjustable connection between said slide supported element and frame including a pair of members one adapted to be wound the other in an arc of the same diameter as the pitch diameter of the element to be ground, whereby the rotation of the slide supported element serves to actuate said slide.

7. A gear generating grinder comprising a frame, a rotary work spindle, a rotary tool, a slide movable upon said frame and supporting one of said rotary parts, and means between said frame and slide supported part, having tangential connection with the latter, for translating the rotational movement of said part into slide actuation.

8. A gear generating grinder comprising a frame, a rotary work spindle, a rotary tool, a slide movable upon said frame and supporting one of said rotary parts, means for rotating said slide supported part in opposite directions, and means connecting said frame and slide supported part including flexible members secured to said frame at points on opposite sides of said slide supported part and adapted to be wound about the latter, whereby to successively draw said spindle toward its points of connection with said frame.

9. A gear generating grinder comprising a frame, a rotary work spindle, a rotary tool, a slide movable upon said frame and supporting one of said rotary parts, means for rotating said slide supported part, and means connecting said frame and slide supported part including a flexible member secured to said frame and adapted to be wound about the axis of said slide supported part, whereby to draw said slide supported part toward its point of connection with said frame.

10. A machine of the character described comprising a frame, a pair of slides movable upon said frame in relatively transverse directions, a gear rotatably mounted upon one of said slides with its axis at right angles to the line of movement of said slide, a support movably mounted upon the other of said slides, a tool mounted on said support, means for adjusting the position of said tool supporting slide, means for adjusting said support, and winding and unwinding means for translating the rotational movement of said gear into reciprocating movement of said gear supporting slide.

11. A machine of the character described comprising a frame, a tool mounted thereon, a slide mounted upon said frame, a gear rotatably mounted on said slide, means for oscillating said gear in opposite directions, and a winding and unwinding appliance for translating the rotational movement of said gear into reciprocation of said slide.

12. A machine of the character described comprising a frame, a tool rotatably mounted thereon, a slide mounted upon said frame, a structure provided with a segment of corresponding diameter as the pitch diameter of the gear to be ground and rotatably mounted on said slide, means for rotating said structure, a gear supported by said structure, and means including a tape wound about said segment for translating the rotational movement thereof into traversing movement of said slide, whereby to roll the gear relative to said tool.

13. A machine of the character described comprising a frame, a tool rotatably mounted thereon, a slide mounted upon said frame, a structure rotatably mounted on said slide and provided with a segment, means for turning said structure, a gear supported by said structure, and means including a pair of tapes each secured to said frame and to said segment for translating said turning movement into reciprocal movement of said slide.

14. A machine of the character described comprising a frame, a support adjustably mounted upon said frame, a tool rotatably mounted on said support, a slide movably mounted upon said frame, a spindle rotatably mounted upon said slide, a segment and a gear to be ground each connected to said spindle, the diameter of said segment being the same as the pitch diameter of said gear, tapes wound about said segment and connected to said frame, and means for turning said spindle in reversed directions to pull upon the ends of said tapes and reciprocate said gear bodily.

15. A machine of the character described comprising a frame, a slide mounted thereon, a support adjustably mounted upon said slide, a tool mounted on said support, another slide movably mounted upon frame, a spindle rotatably mounted upon said last mentioned slide, a work piece carried by said spindle, means for turning said spindle in opposite directions, and means operated by said spindle, for reciprocating said spindle supporting slide.

16. A machine of the character described comprising a frame provided with a bearing, a wheel rotatably mounted in said bearing, a slide movably mounted upon said frame, a spindle rotatably mounted upon said slide, means for turning said spindle, an oscillatory member and a gear to be ground each carried by said spindle, a flexible part wound about said member and connected with said frame whereby simultaneously to move said spindle bodily, said wheel having an abrading face in a plane intersecting said bearing whereby to avoid a whipping action.

17. A gear generating grinder comprising the combination of a frame, a work spindle, a rotatably mounted tool, a slide supporting one of said rotatable elements, and means including a member operatively wound about the axis of and connected to said slide supported element, whereby the rotation of the latter reciprocates said slide.

18. A machine of the character described comprising the combination of a frame, a rotatable work spindle, a rotary tool, a slide movable upon said frame, a head adjustably mounted upon said slide and carrying said tool, another slide movable upon said frame and supporting said spindle, means for driving said tool, means for adjusting the position of said tool slide, means for imparting rotational movement to said spindle, and means for translating such movement of the latter into travel of said work slide.

19. A machine of the character described comprising a frame, a rotatable work spindle, a gear thereon, a rotary tool, a slide adapted to travel on said frame and supporting one of said movable parts, means for turning said spindle, a segment concentrically carried by said spindle and of the same diameter as the pitch diameter of the gear to be operated upon, said segment being adjustable radially to the axis of said spindle, and a flexible member stretched between said frame and segment, whereby the slide travels when the spindle turns.

20. A machine of the character described comprising a frame, a rotatable work spindle, a gear thereon, a tool spindle, a slide adapted to travel on said frame and supporting one of said spindles, means for turning said slide supported spindle, a segment carried by said slide supported spindle and of the same diameter as the pitch diameter of the gear to be operated upon, a flexible member connecting said frame and segment, whereby the slide travels when the slide supported spindle turns, and means for adjusting the connection of said member with said frame or segment.

21. A machine of the character described comprising a frame, a rotatable work spindle, a gear thereon, a rotary tool, a slide adapted to travel on said frame and supporting one of said movable parts, means for turning said spindle, a segment adjustably carried by said spindle and of the same diameter as the pitch diameter of the gear to be operated upon, means for radially adjusting the position of said segment upon said spindle, flexible members connecting different points on said frame with said segment, whereby the slide travels when the spindle turns, and means for adjusting both connections of said members with said frame.

22. A gear grinding machine comprising the combination of a frame, rotatably mounted work and tool spindles, a slide movable thereon and supporting one of said spindles, a gear and a tool secured to said spindles, respectively, means for turning said spindles, a segment mounted to turn with said slide mounted spindle, and means operated by one of said turning movements for effecting a distinct relative movement between said spindles including a member having a tangential relation to the periphery of said segment.

23. A gear grinding machine comprising the combination of a frame, a slide movable thereon, a work spindle rotatably mounted on said slide, a tool rotatably mounted on said frame, means for turning said work spindle through a given arc, a segment mounted to turn with said work spindle, a flexible tape secured to the periphery of said segment and to said frame, means for adjusting the effective length of said tape, and means for rotating said tool.

24. A gear grinding machine comprising the combination of a frame, a tool mounted thereon, a slide movable on said frame, a work spindle rotatably mounted on said slide, a sleeve upon said spindle, means for driving said sleeve in reversed directions, mechanism including a segment and tapes for translating said reversed directions into reciprocating movement of said slide, and indexing mechanism interposed between said sleeve and spindle for causing movement of said spindle relative to said sleeve.

25. A gear grinding machine comprising the combination of a frame, a slide movable thereon, a work spindle movably mounted upon said slide, a gear mounted to turn about the axis of said spindle, means for actuating said spindle, means including flexible members for translating such actuation into reciprocation of said slide, a wheel having a flat cutting face and adjustably mounted on said frame to the pressure angle of the gear teeth to be cut, and means for rotating said wheel, the arrangement being such that a rolling generating contact is had between the gear teeth and wheel.

26. A gear generating grinder comprising a frame, a rotatably mounted work spindle, means for effecting the turning movement of said spindle, a tool, a support for said spindle movably mounted upon said frame, and means including a member tangentially connected with relation to the axis of said spindle for translating the movement of said spindle into slide movement of said support.

27. A machine of the character described comprising the combination of a frame, a work spindle rotatably mounted thereon, a rotary tool having a planular cutting face, a reciprocable slide supporting one of said engageable rotatable parts, means for rotating the slide supported part, and means including a pair of members each operatively connected with said frame and said slide supported part in tangential relation to a segment turning on the same axis as such part for effecting the reversed movements of said slide.

28. A machine of the character described comprising the combination of a frame, a slide movable on said frame, a rotatable work spindle structure carried by said slide and having its axis at right angles to the direction of movement of said slide, a tool, means for imparting rotational movement to said structure, the latter including an arcuate part and a member coacting therewith and connected with said frame for translating the rotatable movement of said structure into slide actuation.

29. A machine of the character described comprising a frame, a slide movable upon said frame, a spindle rotatably mounted upon said slide so as to be capable of turning movement about an axis at right angles to the line of movement of said slide, a tool mounted on said frame, means for turning said spindle, and means actuated by said turning movement and adapted to move said slide.

30. A machine of the character described comprising the combination of a frame, a slide movable on said frame, a work spindle mounted for turning movement on said slide, a tool, means for turning said work spindle, and means actuated by said work spindle for moving said slide at a rate equal to the pitch circumference of the work translated into linear travel.

31. A gear grinding machine comprising the combination of a frame, rotatably mounted work and tool spindles adapted to carry a gear and a tool, respectively, means for turning said spindles, and means operated by one of said turning movements for effecting a distinct relative movement between said spindles at right angles to the axis of said turning movement from which power for said distinct relative movement is derived.

32. In a machine of the character described the combination of a frame, a slide movable thereon, a spindle mounted for turning movement upon said slide, means for turning said spindle in opposite directions, and a winding and unwinding connection between said frame and spindle adapted to effect the reciprocation of said slide.

33. A machine of the character described comprising a frame, a slide movably mounted on said frame, a spindle rotatably mounted on said slide, a work piece carried by said spindle, means for turning said spindle in opposite directions, and means operated by said spindle for reciprocating said slide.

34. A machine of the character described comprising relatively movable supports, a work spindle carried by one of said supports, flexible connections between said spindle and the other support and connected to the latter at opposite sides of said spindle, and means for rotating said spindle in opposite directions, whereby said connections are wound on and unwound from said spindle and the rotational movements thereof are translated into reciprocatory relative movements between said supports.

Signed by me, this 30th day of August, 1919.

ERNEST J. LEES.